Patented Mar. 16, 1926.

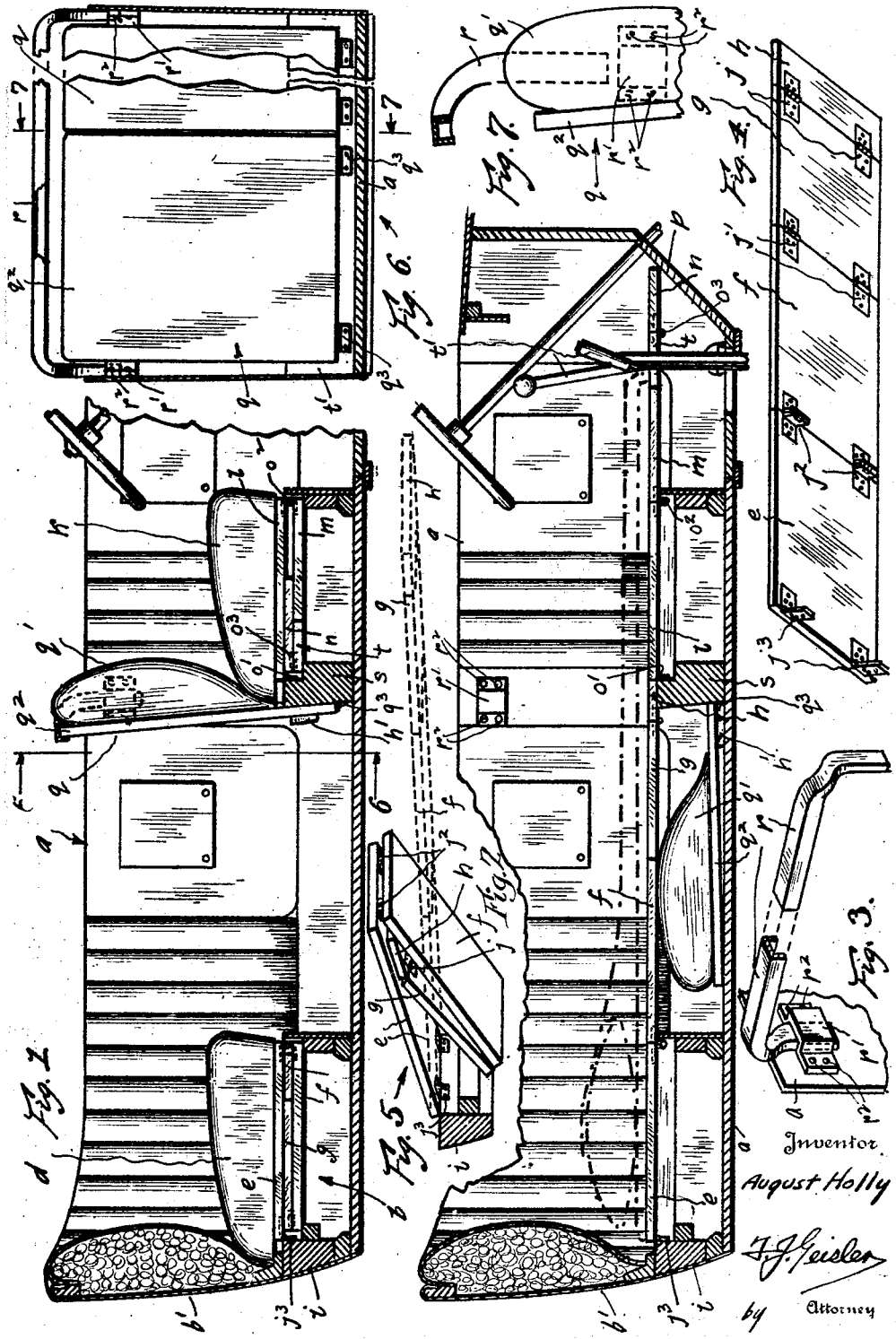

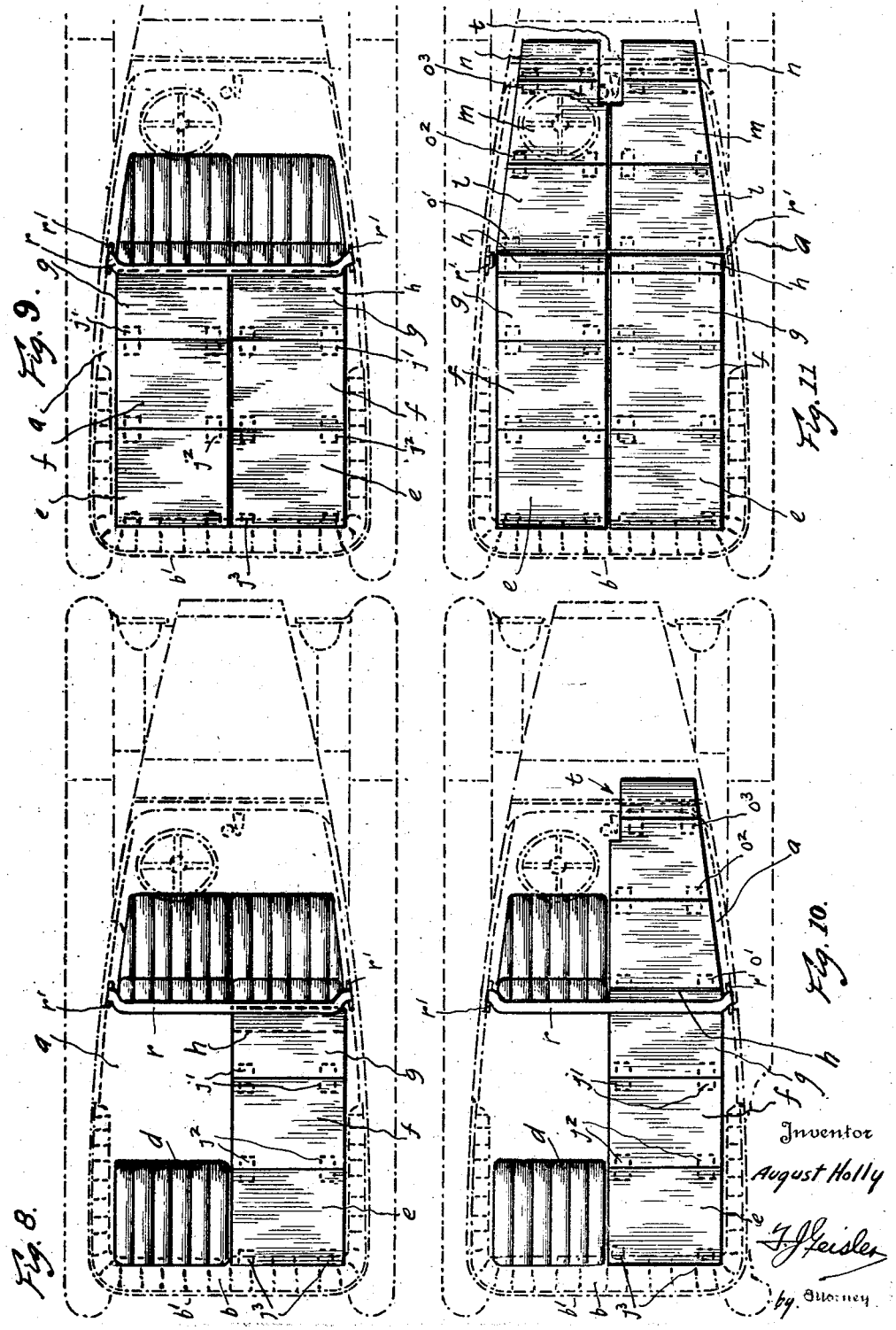

1,577,232

UNITED STATES PATENT OFFICE.

AUGUST HOLLY, OF PORTLAND, OREGON.

CONVERTIBLE SEAT FOR AUTOMOBILES.

Application filed June 9, 1924. Serial No. 718,881.

*To all whom it may concern:*

Be it known that I, AUGUST HOLLY, a citizen of the United States, and a resident of Portland, county of Multnomah, and State of Oregon, have invented a new and useful Improvement in Convertible Seats for Automobiles, of which the following is a specification.

The object of my invention is to provide a seat for vehicles or cars of the present automobile type which may be converted in whole or in part into a bed within the car. Preferably, the seat is composed of two contiguous sections, each of which is adapted to be arranged to form a bed. Thus one section of the seat may be converted into a bed and the other may be left as a seat. In this way the car can be used as an ambulance, or, on long trips, one of the parties can sleep while the other is driving.

When my invention is applied to a car provided with front and rear seats both of the seats are adapted to be arranged in whole or in part to form a bed.

I carry the main idea of my invention into practice by providing a seat comprising a main seat piece and auxiliary pieces hinged to the latter, said auxiliary pieces being adapted to be folded under said main seat piece and to be extended and arranged in the same plane as the latter to form a bed.

A further object of my invention is to attain the said results by means which are simple and inexpensive to manufacture.

The details of my invention are hereinafter described with references to the accompanying drawings, in which:

Fig. 1 is a longitudinal vertical section taken approximately on the center line of the vehicle and shows the seats in their normal position;

Fig. 2 is a section taken on the same line and shows the positions of the seat extended to provide a structure upon which a bed can be laid;

Fig. 3 is a fragmentary perspective view illustrating a detail of construction;

Fig. 4 is also a fragmentary perspective view showing the extensible portion, which is a part of the rear seat of the vehicle, fully extended;

Fig. 5 is a diagrammatic illustration of the extensible portion and shows the portions extended, in dotted lines.

Fig. 6 is a vertical section taken approximately along the line 6—6 of Fig. 1, except that the transverse retaining member has been raised out of engagement with the back of the seat;

Fig. 7 is a fragmentary section taken on the line 7—7 of Fig. 6.

Fig. 8 is a plan view of an automobile, the seats alone being shown in full lines the remainder being in dotted outline, this view showing one-half of the back seat extended to form a bed;

Fig. 9 is a view similar to Fig. 5 showing both halves of the back seat extended to form a bed;

Fig. 10 is a similar view, showing one-half of the rear seat and one-half of the front seat on the same side extended to form a bed; and Fig. 11 is a similar view showing all of the seat portions arranged to constitute a bed.

My invention is adapted to be incorporated in an automobile $a$ which is provided with a back seat $b$ and a front seat $c$. The rear portion of the body constitutes the back $b'$ of the back seat and is upholstered in the usual manner, and is shown in Figs. 1 and 2.

The seat portion of the back seat is provided with two removable cushions $d$ which are normally supported upon two members made up of four flat sections $e$, $f$, $g$ and $h$, hinged so that, when they are fully extended, they will constitute a continuous surface, as shown in Fig. 4. Each portion $e$ is hingedly attached to a transverse member $i$ mounted on the body $a$ directly under the back $b'$ of the back seat.

The summation of the lengths of the members $g$ and $h$ is substantially equal to the lengths of the sections $e$ and $f$ individually and thus the portions can be folded into a flat package of three layers as shown in Fig. 1. The portions $g$ and $h$ are connected by flat hinges $j$ and the sections $f$ and $g$ are connected together by similar flat hinges $j$ but the sections $f$ and $g$ are connected together by hinges $j^2$ which are provided with pendent portions substantially as long as the thickness of one layer so as to permit the hinged connection to lie a substantial distance below the under surface thereof, thus to permit the sections to be folded together. The portion $e$ is hingedly connected to the transverse member $i$ by hinges $j^3$. The seat portions of the front seat are provided with members made up of three sections $l$, $m$ and $n$ which support the seat cushion $k$. The length of the section $n$ is determined by the distance between the inclined floor boards of the machine from the floor and the seat. The section $l$ is fastened to the fixed seat structure by hinges $o'$ and to the section $m$ by hinges $o^2$ and the sections $m$ and $n$ are connected by hinges $o^3$.

As shown in Fig. 2, the forward edge of the section $n$ is adapted to rest upon the inclined section $p$ of the floor boards, at a point in the plane which the member, consisting of these hinged portions, will lie horizontally.

The back $q$ of the front seat is upholstered at $q'$ and the unupholstered portion $q^2$ extends slightly above the upholstered portion so that it can be gripped by the transverse channel-shaped member $r$ which is releasably held in brackets $r'$ at each side of the vehicle, the brackets being fastened by screws $r^2$. The lower edge of the section $q^2$ is hinged to a transverse member $s$ which forms one of the supports for the front seat by hinges $q^3$.

When it is desired to make a bed in the vehicle the devices are arranged as follows:

The transverse channel shaped retaining member $r$ is lifted vertically from place and either or both halves of the back of the front seat can then be swung so that it will rest against the floor of the car as shown in Fig. 2. The seat cushions $d$ and $k$ are then removed and the portions $e$, $f$, $g$, $h$ are extended outwardly so that they will form a continuous surface in the vehicle in a plane with the top or fixed portion of the seat. The members $l$, $m$ and $n$ can likewise be extended and will form a continuation of the members previously enumerated.

When all of the members are extended so as to form a bed structure within the car over its entire cross sectional area, the bed structure will resemble Fig. 11.

If, however, it is desired to make a bed in only a portion of the car, as shown in Fig. 8 in which only one-half of the back seat is used for a bed, the members $e$, $f$, and $g$ are extended and the member $h$ is arranged so that it will be folded under and will engage the lug $h'$ on the back $q$ of the front seat which will thus constitute a support for the free end of the member $g$.

If it is desired to use the entire back seat for a bed as shown in Fig. 9, the front halves of the extensible portions $e$, $f$ and $g$ are extended and the halves of the portion $h$ hang pendent to constitute supports.

If it is desired to use the entire half of the vehicle, that is one half of both front and back seats, as for example if the device is used as an ambulance, the members $e$, $f$, $g$ and $h$ are fully extended on one seat, as are the same halves of the sections $l$, $m$ and $n$. To release the back of the front seat the transverse channel shaped section $r$ is lifted from position to permit one-half of the back portion $q$ of the front seat to be lowered and the channel section $r$ is then replaced so as to hold the remaining half of the back seat. The section $n$ is cut away at $t$ to straddle the brake and clutch operating levers $t'$. There is no necessity to cut away from the steering post because the portion $n$ is adapted to rest against the inclined portion $p$ of the floor at a point below the point at which the steering post passes through this inclined portion of the floor.

I claim:

1. In a vehicle of the type described provided with front and rear seats each comprising a main seat piece, and auxiliary pieces hinged to each of said main seat-pieces, said auxiliary pieces being adapted to be folded under said main seat-piece and to be extended and arranged in the same plane as the latter to form a bed, said rear seat extending to and adapted to rest on the frame of the front seat, the back of the front seat being adapted to be dropped back and placed on the floor of the car and in that position providing a support for the middle portion of said bed.

2. In a vehicle of the type described provided with front and rear seats each comprising a main seat piece, and auxiliary pieces hinged to each of said main seat-pieces, said auxiliary pieces being adapted to be folded under said main seat-piece and to be extended and arranged in the same plane as the latter to form a bed, said rear seat extending to and adapted to rest on the frame of the front seat, the back of the front seat being hinged to the seat frame and adapted to be dropped back and placed on the floor of the car and in that position providing a support for the middle portion of said bed.

AUGUST HOLLY.